United States Patent
Demitroff et al.

(10) Patent No.: US 9,920,846 B2
(45) Date of Patent: Mar. 20, 2018

(54) LOW RESTRICTION VARIABLE FLOW VALVE WITH DIRECTIONAL CONTROL

(71) Applicant: Ford Global Technologies, LLC, Dearborn, MI (US)

(72) Inventors: Danrich Henry Demitroff, Okemos, MI (US); Cary Cole, Livonia, MI (US); Sunil Katragadda, Canton, MI (US); Lawrence Marshall, Saint Clair Shores, MI (US); Furqan Shaikh Zafar, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 14/937,522

(22) Filed: Nov. 10, 2015

(65) Prior Publication Data
US 2017/0130849 A1    May 11, 2017

(51) Int. Cl.
*F16K 11/087* (2006.01)
*F16K 11/07* (2006.01)
*F16K 11/085* (2006.01)

(52) U.S. Cl.
CPC .......... *F16K 11/07* (2013.01); *F16K 11/0853* (2013.01)

(58) Field of Classification Search
CPC ................. F16K 11/07; F16K 11/0853; Y10T 137/86533; Y10T 137/86863; Y10T 137/86871
USPC .......... 137/625.15, 625.41, 625.47, 876, 883
See application file for complete search history.

(56) References Cited

U.S. PATENT DOCUMENTS

| | | | |
|---|---|---|---|
| 3,319,650 A | | 5/1967 | Peterson |
| 3,937,252 A | * | 2/1976 | Ishida .............. F15B 21/125 137/624.13 |
| 4,428,558 A | * | 1/1984 | Odogaki ............ F16K 31/082 137/625.47 |
| 4,546,338 A | * | 10/1985 | Idogaki .............. F02M 3/07 137/625.47 |
| 5,617,815 A | * | 4/1997 | Spies .............. F16K 11/076 123/41.1 |
| 6,196,266 B1 | * | 3/2001 | Breda ............. F16K 11/0853 137/454.6 |
| 6,955,188 B2 | | 10/2005 | Heckt |
| 2004/0154671 A1 | * | 8/2004 | Martins ............ B60H 1/00485 137/625.47 |
| 2009/0065172 A1 | * | 3/2009 | Vacca .............. F16K 11/085 165/41 |

FOREIGN PATENT DOCUMENTS

CN        2773763 Y    4/2006

* cited by examiner

*Primary Examiner* — Reinaldo Sanchez-Medina
(74) *Attorney, Agent, or Firm* — Julia Voutyras; McCoy Russell LLP (57) ABSTRACT

Methods and systems are provided for regulating fluid flow through a three-way valve assembly, including a three-way split conduit coupled to a movable rotary ring with plurality of openings. In one example, a three-way split conduit may include one fluid inlet conduit splitting into two outlet conduits with an included angle of less than 90 degrees between the two splitting outlet conduits. A movable rotary ring coupled to the three-way split conduit may be rotated by an actuator to open or block the three way split conduits, regulating the fluid flow passages along the three-way valve assembly.

20 Claims, 9 Drawing Sheets

LOW RESTRICTION VARIABLE FLOW VALVE WITH DIRECTIONAL CONTROL

FIELD

The present description relates generally to methods and systems for controlling fluid flow through a valve.

BACKGROUND/SUMMARY

Fluid flow circuits, such as coolant circuits that may be present in engine systems to cool the engine and/or provide cabin heat, among other functions, may be configured with one or more engine-driven and/or electrical pumps that circulate fluid through the circuit. These circuits may include one or more flow control valves to regulate the flow of fluid in two different flow paths. Control systems may be configured to adjust the operation of the valves to regulate the flow of fluid, for example by directing coolant to flow through different flow paths to meet desired heating and/or cooling parameters.

Conventional flow control valves may be configured in a T-shape with two ninety-degree bends, which may split the flow of fluid in two different directions, thereby regulating the fluid flow paths to achieve optimal cooling and heating outcomes for an engine and other associated systems, for example. The direction of fluid flow in the above described valves may be regulated by valve flaps, valve plates, etc.

However, the inventors herein have recognized potential issues with such systems. As one example, in a T-shaped valve with two ninety-degree bends, a significant pressure drop across the valve is observed. This high pressure drop may cause an increase in fluid circuit restriction. Hence, increased pump power may be required to pump the fluid. The larger pump power consumption increases the cost, packaging space required, and in some examples may increase fuel consumption.

To mitigate the problem of a high pressure drop in fluid flow valves, the inventors herein provide a valve assembly comprising a housing, a split conduit fixed to the housing and including a first conduit splitting into a second conduit and to a third conduit at a junction, an included angle of the second conduit and third conduit at the junction being less than 90 degrees, and a rotary ring movable relative to the housing and having a plurality of openings configured to control fluid flow through the split conduit.

In this way, by providing a split flow path through the valve assembly where the included angle at the split is less than 90 degrees, the pressure drop across the valve assembly may be lowered. The split conduit may provide a first flow path that may include the first conduit and the second conduit and a second flow path that may include the first conduit and the third conduit. Further, a rotary ring is rotatable relative to the housing to efficiently control flow of fluid through the valve assembly. The first flow path and second flow path may each be maintained along an entirety of the split conduit, regardless of a position of the rotary ring, reducing the number of joints present in the valve assembly and hence lowering the likelihood fluid will leak from the valve assembly. Further still, in some examples an actuator may be axially coupled to the rotary ring, thus lowering the packaging space of the valve assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for regulating flow of fluid using a three-way valve assembly, and specifically relates to controlling coolant flow in an engine system.

Figure 1:
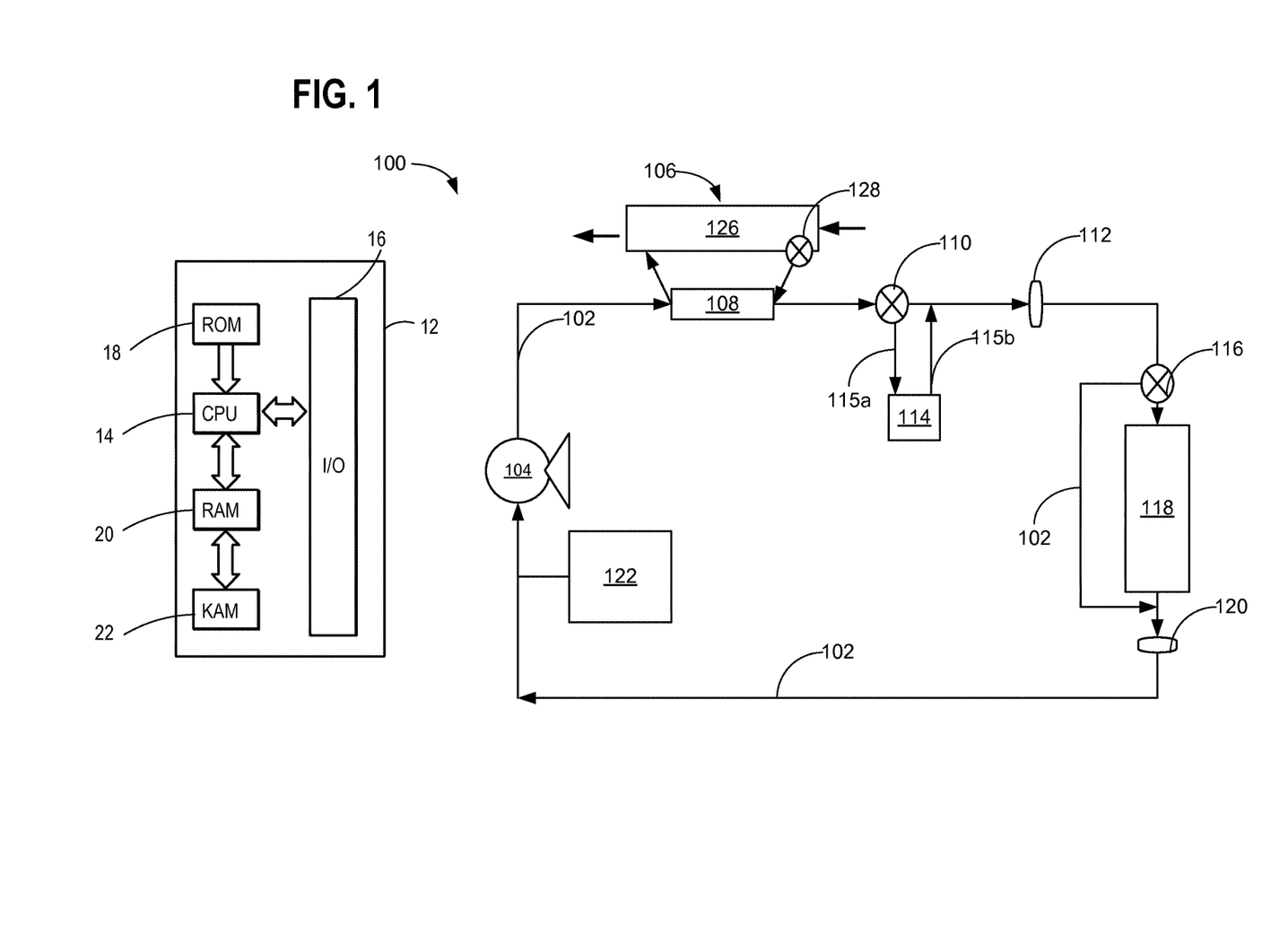
FIG. 1 shows an example of an exhaust gas heat storage and recovery system with a coolant loop and associated coolant flow valves.
Figure 2:
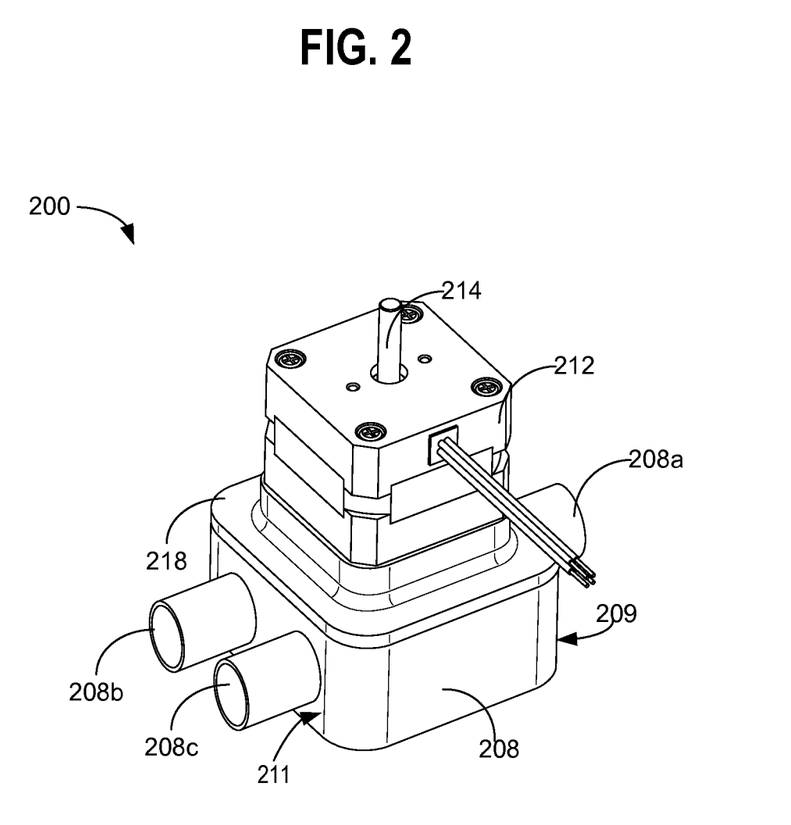
FIG. 2 shows a three-way valve assembly.
Figure 3:
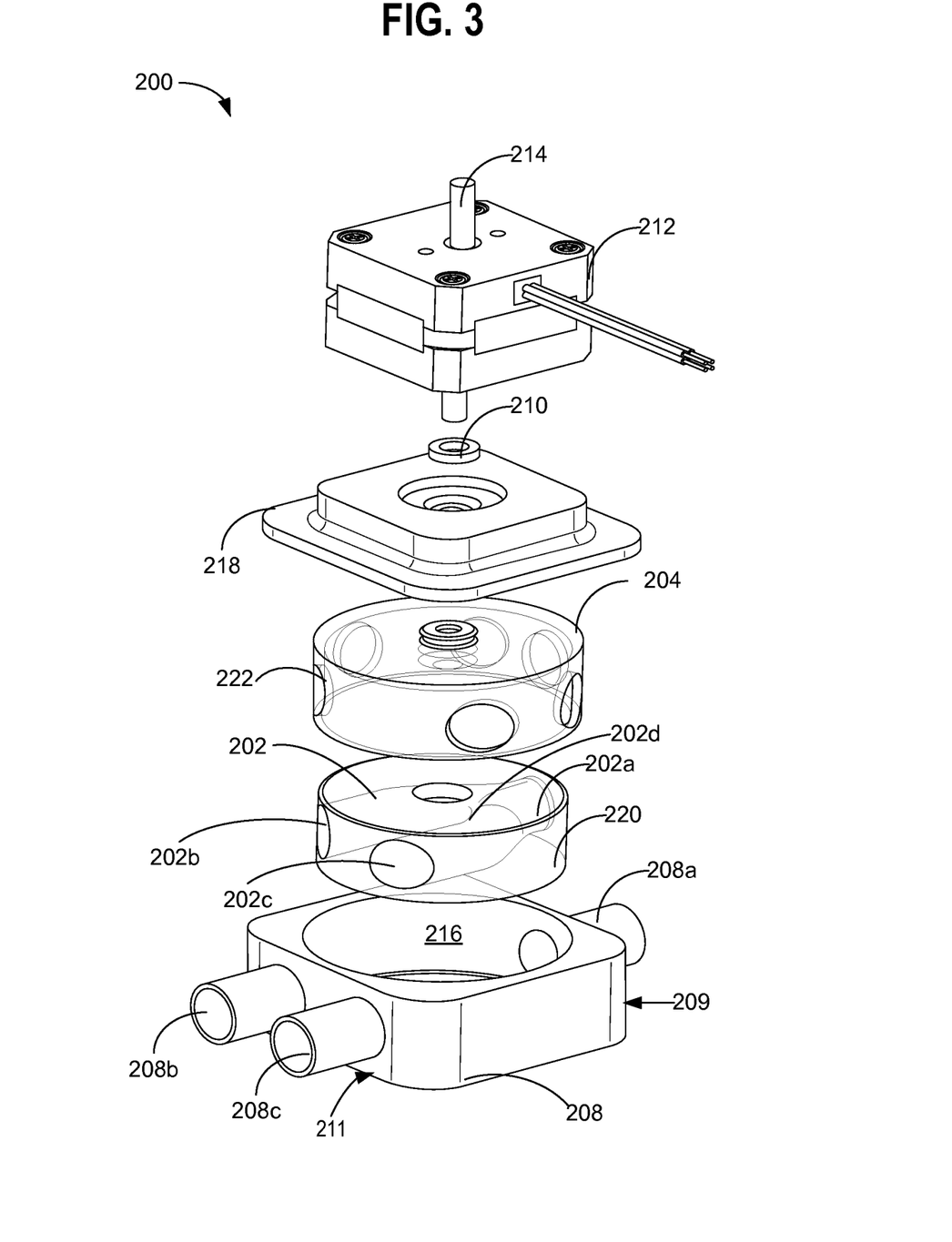
FIG. 3 shows the components of the valve assembly of FIG. 2.
Figure 4:
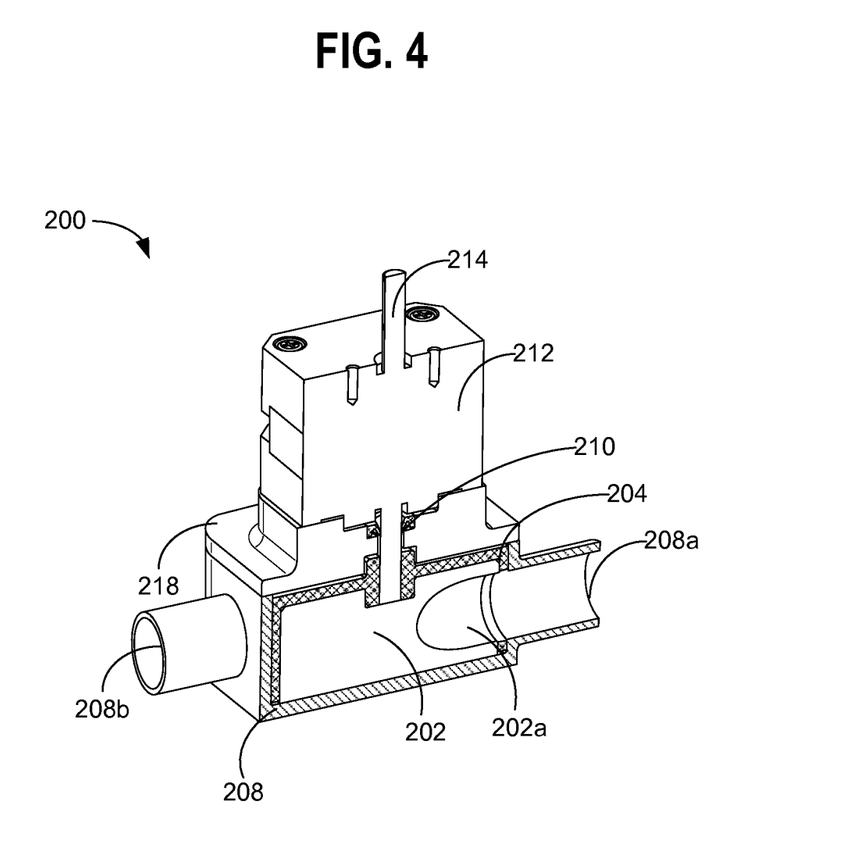
FIG. 4 shows a cross-section of the three-way valve assembly of FIG. 2.
Figure 5A:
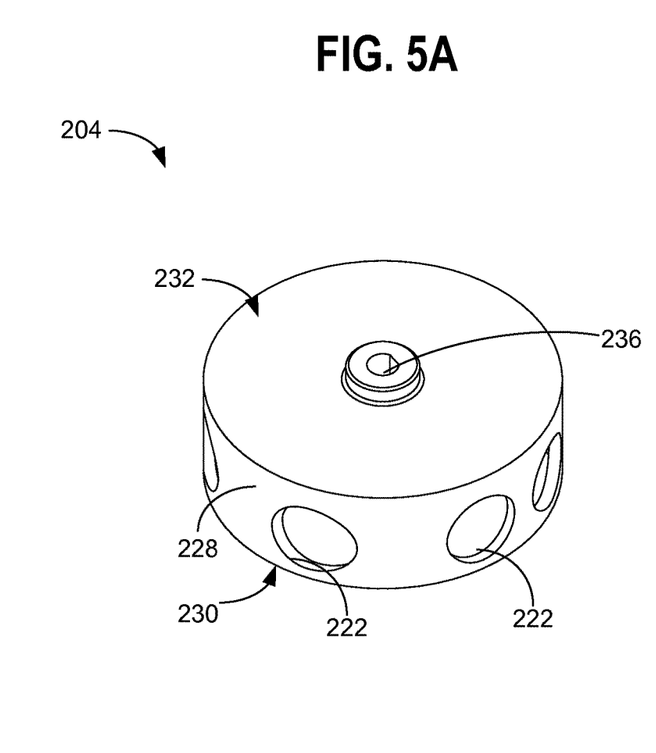
FIG. 5A shows a top-down view of an embodiment of a rotary ring used in a three way valve assembly.
Figure 5B:
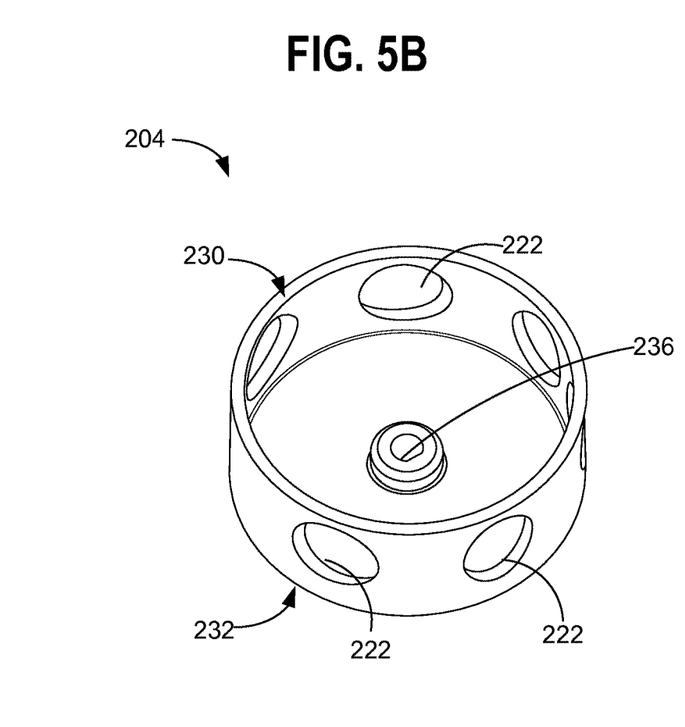
FIG. 5B shows a bottom-up view of the rotary ring of FIG. 5A.
Figure 6:
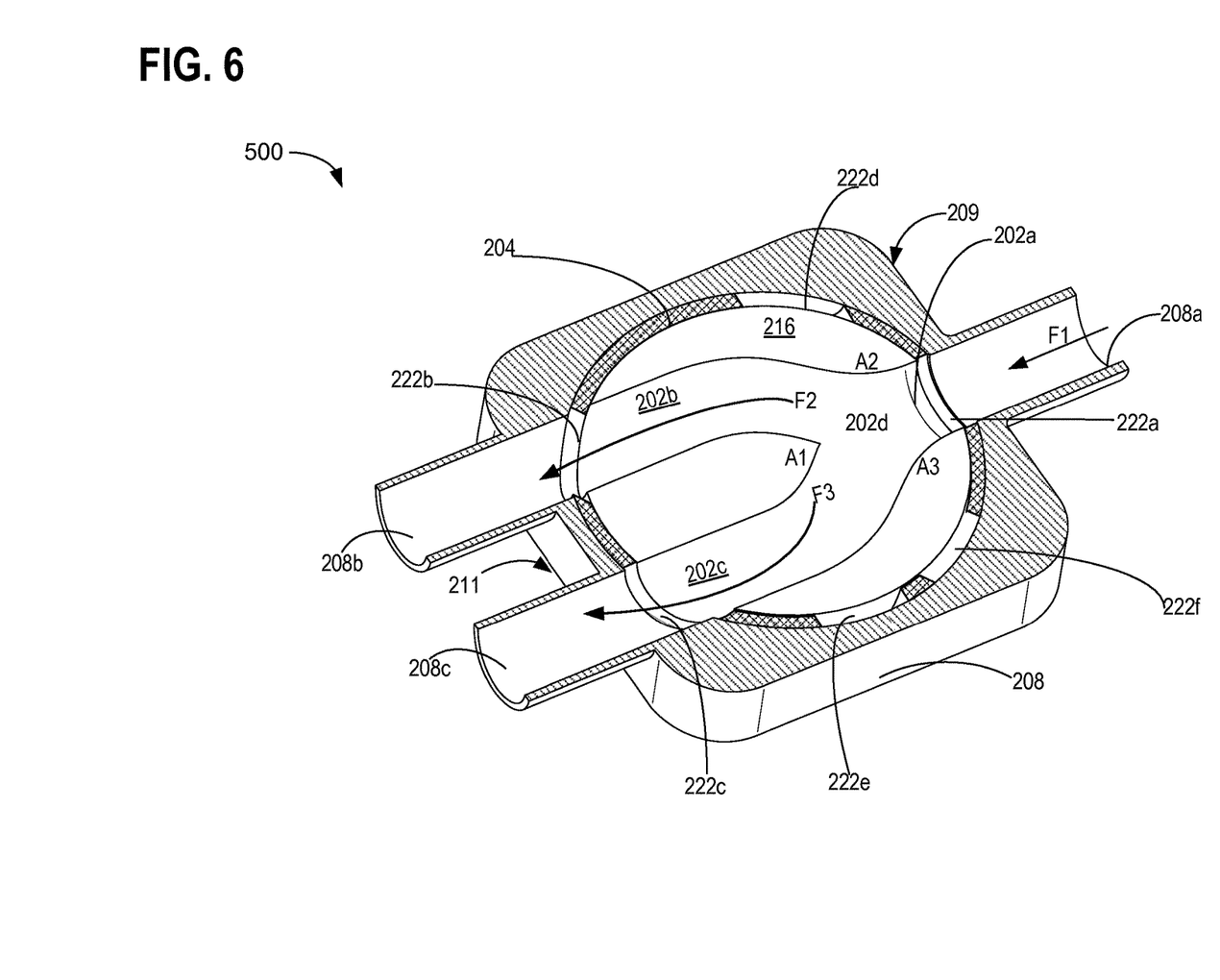
FIG. 6 shows a three-way valve with a mounted rotary ring in a first position.
Figure 7:
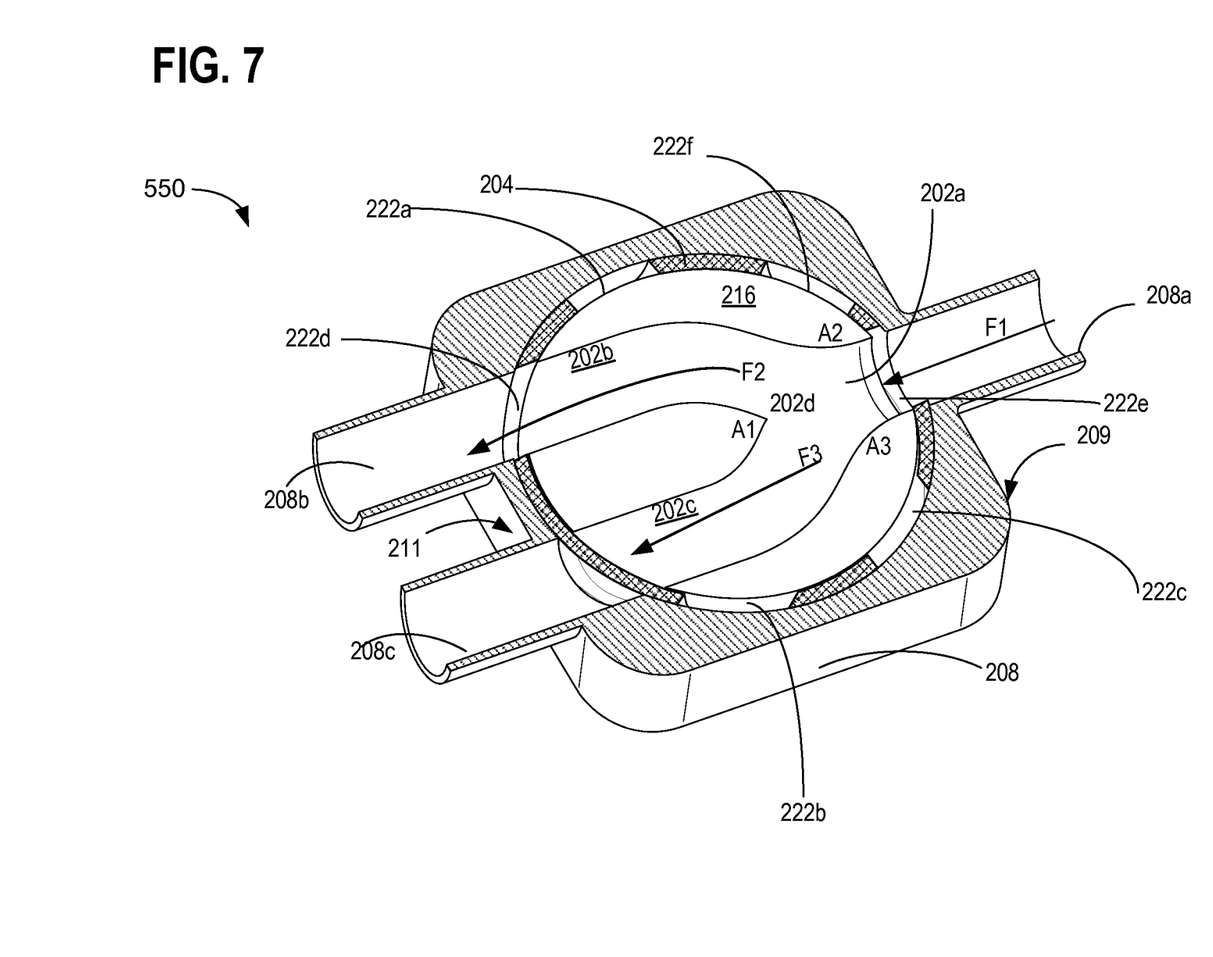
FIG. 7 shows a three-way valve with a mounted rotary ring in a second position.
Figure 8:
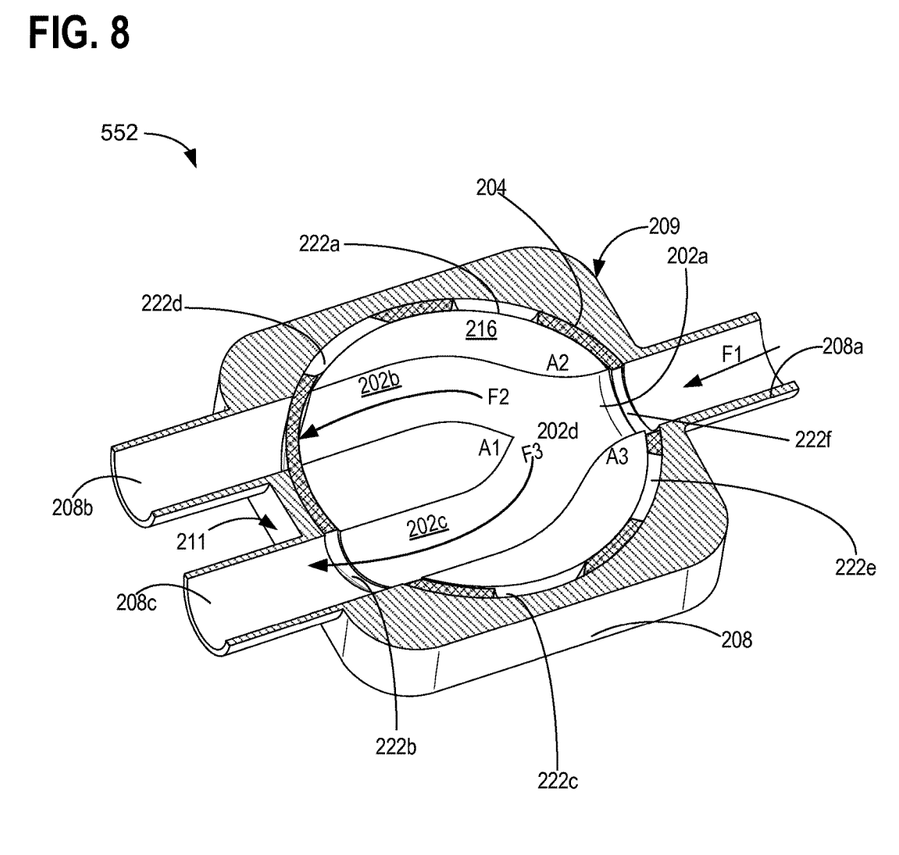
FIG. 8 shows a three-way valve with a mounted rotary ring in a third position.

An example coolant loop of an engine system including an exhaust gas heat recovery and storage system is shown in FIG. 1. The coolant loop is coupled to fluid flow valves which may regulate the flow of coolant along the coolant loop. To reduce pressure change across a fluid flow valve, the current disclosure describes a three-way valve assembly with one inlet splitting into two outlets, wherein the angle between the two splitting outlets of the three-way valve is less than 90 degrees. The three-way valve assembly comprises of a housing with a rotary ring and a three-way split conduit, a cover and an actuator coupled to the valve assembly rotary ring by a common shaft, as illustrated in FIG. 2-4. The rotary ring with a plurality of openings to regulate the flow paths along the three-way valve is illustrated in FIGS. 5A and 5B. In one example illustrated in FIG. 6, the rotary ring coupled to the three-way valve is in a first position which allows fluid to flow in through a first conduit of the three-way split conduit, splitting the fluid into two flow paths along the two outlet conduits of the three-way valve. In FIGS. 7 and 8 the rotary ring mounted on the three-way valve is in a second and third position respectively, opening a flow paths along one of the splitting outlet conduits of the three-way valve while closing the other outlet conduit. A sample method for regulating flow through a three-way valve with a rotary ring is described in FIG. 9.

FIG. 1 shows an example of a cooling system 100 including exhaust gas heat storage and recovery system with valve regulated coolant flow through a coolant loop, which may be included in an engine system. In an embodiment of the cooling system 100, coolant is circulated via coolant line 102 by a fluid pump 104. In one example, the fluid pump 104 may be electrically driven, via an alternator or battery, for example. In a further example, the fluid pump 104 may be mechanically driven, via an engine, for example. The direction of coolant flow in the coolant line 102 is indicated by arrows.

The cooling system 100 couples the coolant line 102 to an Exhaust Gas Heat Recovery (EGHR) system 106, a thermal battery storage system 114, and a heat exchanger 118. The heat exchanger 118 may be a suitable heat exchanger, such as a real axle heat exchanger for warming transmission fluid at the rear axle of a vehicle in which the coolant system is installed, a cabin heater core, or other heat exchanger.

The direction of coolant flow along the coolant line 102 and the associated systems may be regulated by one or more three-way valves. In one embodiment, the flow of coolant downstream of the EGHR 106 may be regulated by a three-way valve 110. The valve 110 may regulate the flow of coolant to the thermal battery storage system 114. The flow of coolant through the heat exchanger 118 may be regulated by coolant three-way valve 116, upstream of the heat exchanger 118. The valves 110 and 116 may be three-way valves splitting the coolant flow in two different flow paths, as will be described in more detail below with respect to FIGS. 2-10. The coolant line 102 may be fluidically coupled to a degas bottle/tank 122. The coolant after degassing in the degas tank may be available in the coolant line 102 connecting to the fluid pump 104 for further recirculation.

An internal combustion engine emits hot exhaust gases through an exhaust system using exhaust pipes. The coolant loop is brought into heat exchange relation with the exhaust gas to scavenge heat from the exhaust gas for storage in the thermal battery storage system 114. The EGHR system 106 may include an exhaust heat exchanger 108 capable of transferring heat from a flow of exhaust gas from an internal combustion engine to the coolant. The hot gas stream may be the exhaust gas from a diesel engine, a gasoline engine, or other suitable engine. In one example, the exhaust gas flows through an exhaust passage 126. The exhaust passage 126 may receive exhaust gas from an exhaust manifold of the engine or other exhaust component. The EGHR system 106 recovers heat from the flow of exhaust gas and transfers the heat to the engine coolant flowing through the coolant line 102 through the exhaust gas heat exchanger 108. The hot exhaust gas may be routed from the exhaust passage 126 to the exhaust heat exchanger 108 through a gas bypass valve 128. The bypass valve 128 may be controlled by the controller based on feedback from a temperature sensing device which may sense the temperature of the exhaust gasses. The controller may signal to actuate the bypass valve 128 at a predetermined exhaust gas temperature, diverting the exhaust gases to the exhaust heat exchanger 108 for heat exchange with the coolant. The bypass valve 128 shuts off the flow of the exhaust gas to the heat exchanger 108 when the heat exchange is no longer desired, such as when exhaust gas temperature is below a threshold or when the thermal battery is full of hot coolant. The hot exhaust gasses may pass through the heat exchanger 108 which may transfer heat from the hot exhaust gas to the coolant in coolant line 102 coupled to the exhaust gas heat exchanger 108. The cooled exhaust gas after the heat exchange with the coolant through the exhaust heat exchanger 108 may be delivered back to the exhaust passage 126 and then passed to downstream components and in some examples to atmosphere.

Downstream of the exhaust gas heat exchanger 108, the coolant flow may be regulated by the coolant valve 110. The coolant valve 110 may be a three-way valve having an input for receiving coolant flow via coolant line 102 from the EGHR system 106, and two separate and distinct output conduits. In one example, the first output conduit of the coolant valve 110 may be along the coolant line 102, directing the coolant flow towards the heat exchanger 118 and the coolant pump 104. The second output of the coolant valve 110 may direct coolant flow towards the thermal storage system 114 through the thermal storage system inlet 115*a*. The thermal battery system 114 may store excess thermal energy from the coolant. The thermal battery system 114 may provide the stored excess thermal energy back to the coolant line 102 through a thermal battery outlet 115*b*. A coolant valve 116 may regulate the flow of the coolant through the heat exchanger 118. Similar to coolant valve 110, the coolant valve 116 may have one input conduit and two distinct output conduits. A first output may direct coolant to the heat exchanger 118 while a second output may direct the coolant towards the pump 104, bypassing the heat exchanger 118.

The coolant system 100 may be coupled to and regulated by input from multiple temperature sensors. In one embodiment, the coolant system 100 may include a first temperature sensor 112 and a second temperature sensor 120 for sensing the temperature of the coolant in the coolant line 102. In one embodiment, the temperature sensor 112 may be positioned in the coolant line 102 downstream of the exhaust heat exchanger 108 and the thermal battery storage system 114. The second temperature sensor 120 may be placed on the coolant line downstream of the heat exchanger 118. The temperature sensors 112 and 120 may be electronically coupled to a controller, and may be configured to send a signal indicating the temperature of the coolant thereto.

Controller 12 is shown in FIG. 1 as a microcomputer, including microprocessor unit 14, input/output ports 16, an electronic storage medium for executable programs and calibration values shown as non-transitory read only memory chip 18 in this particular example for storing executable instructions, random access memory 20, keep alive memory 22, and a data bus. Controller 12 may receive various signals from sensors coupled within the coolant system, in addition to those signals previously discussed. The controller 12 receives signals from the various sensors of FIG. 1 and employs the various actuators of FIG. 1 to adjust system operation based on the received signals and instructions stored on a memory of the controller. As an example, the controller may receive the signal from the temperature sensor 112 and determine if the sensed temperature of the coolant is less than, equal to, or greater than a pre-defined temperature. The control module then signals the control valve 110, based on the determination that the temperature of the engine coolant is less than, equal to, or greater than the pre-defined temperature, to direct the flow of the engine coolant along one or more of a fluid flow path towards the heat exchanger 118 or to a second fluid flow path to the thermal battery storage system 114.

Similarly, the controller may receive the signal from the temperature sensor 120, sensing the coolant temperature downstream of the heat exchanger 118, and may determine if the sensed temperature of the coolant is less than, equal to, or greater than a pre-defined temperature. The control module may then signal the control valve 116 to direct the flow of the engine coolant along one or more of a fluid flow path to the heat exchanger 118 for heat exchange or to a second fluid flow path bypassing the heat exchanger, as illustrated in the schematic in FIG. 1. An example method for regulating fluid flow through a three-way fluid valve is described in FIG. 9.

Referring to FIGS. 2-8, a three-way valve assembly 200 splitting one fluid inlet into two distinct fluid outlets is shown. The three-way valve assembly 200 is one non-limiting example of the coolant valve 110 and/or 116 described in FIG. 1. For purpose of discussion, FIGS. 2-8 will be described collectively. As illustrated in FIGS. 2-8, a valve housing 208 houses a fixed three-way split conduit 202 and a movable rotary ring 204. The three-way split conduit 202 may have a first inlet conduit 202a which may split into a second conduit 202b and a third conduit 202c at a conduit junction 202d, where an included angle between the second conduit 202b and the third conduit 202c at the junction is less than 90 degrees. The three-way split conduit 202 may be housed in a conduit chamber 220 that may be inserted into the housing 208. The rotary ring 204 inserted in the housing 208 may have a plurality of openings 222 configured to open or block the three-way split conduit 202 to control fluid flow through the three-way valve assembly 200. The housing 208 may have a housing cover 218 configured to couple to the top of the housing 208. The housing cover 218 secures the three-way split conduit 202 and the movable rotary ring 204 inside the housing 208. The housing cover 218 may also be intermediate to an actuator 212 with a seal 210 between the actuator and the housing cover 218. A common shaft 214 passing through the actuator 212, the seal 210, and the housing cover 218, inserts into the movable rotary ring 204, coupling the rotary ring 204 to the actuator 212, as illustrated in the valve assembly shown in FIGS. 2-4.

The housing 208 of the valve assembly 200 may include a circular housing chamber 216 and three openings positioned on the rectangular outer perimeter of the housing 208, connecting to the housing chamber 216 within. In the embodiment illustrated in FIGS. 2-4, a housing first opening 208a is on a first wall 209 of housing 208 and a second opening 208b and a third opening 208c are positioned on a housing second wall 211 opposite the housing first wall 209. The housing openings may fluidically couple to a fluid circuit and may also fluidically couple to the three-way split conduit 202 inserted inside the housing chamber 216. The housing chamber 216 may be circular in shape to complement and accommodate the movable rotary ring 204 and the conduit chamber 220 with the three-way split conduit 202. The three-way split conduit 202 within the conduit chamber 220 is fixed inside the housing chamber 216 such that the housing 208 openings may align with and fluidically couple to the three-way split conduit 202, as illustrated in FIG. 6-8. The three-way split conduit first conduit 202a may be aligned with and fluidically coupled to the housing first opening 208a. The three-way split second conduit 202b may be aligned with and fluidically coupled to the second opening 208b, and the three-way valve third conduit 202c may be aligned with and fluidically coupled to the housing third opening 208c. A plurality of seals, coupled to the interior of the housing around the first opening 208a, the second opening 208b, and the third opening 208c of the housing may interface with the corresponding three-way split conduit 202, forming a liquid-tight seal. In other embodiments, the outer perimeter of the housing 208 may be circular, triangular, oblong etc. and the three housing openings may be positioned such that they may align and fluidically couple with the three-way split conduits inserted into the housing chamber 216.

The three-way split conduit 202 of the valve assembly 200 includes the first conduit 202a splitting at the conduit junction 202d into the second conduit 202b and the third conduit 202c, as illustrated in FIG. 3. The three-way split conduit 202 may function to direct fluid flow input through the first conduit 202a and split the fluid flow into the second conduit 202b and the third conduit 202c. In one embodiment shown in FIG. 3, the three-way split conduit 202 may be inserted into the conduit chamber 220, such that the conduit chamber 220 may not block fluid flow through the three-way split conduit 202. The conduit chamber 220 with the three-way split conduit 202 may be inserted into the housing chamber 216 such that the conduit chamber 220 and the housing chamber 216 interface to fix the three-way split conduit 202 to the housing chamber 216. In one example, an adhesive may be used to fix the conduit chamber 220 inside the housing chamber 216, aligning the three-way split conduit 202 with the corresponding housing 208 openings. In other examples, the conduit chamber 220 may be bolted, welded, or otherwise fixed to the housing 208. In still further examples, the conduit chamber 220 may be dispensed with, and the split conduit may be directly coupled to the housing.

Referring to FIGS. 6-8, the angle between the second conduit 202b and the third conduit 202c at the junction 202d may be less than 90 degrees, reducing the pressure drop across the valve assembly 200. In one example, an angle A1 between the second conduit 202b and the third conduit 202c may be 60 degrees and an angle A2 between the first conduit 202a and the second conduit 202b may be greater than 90 degrees and may be equal to an angle A3 between the first conduit 202a and the third conduit 202c. In another example, the angle A2 between the first conduit 202a and the second conduit 202b and the angle A3 between the first conduit 202a and the third conduit 202c may be unequal while the angle A1 between the second conduit 202b and the third conduit 202c may be 60 degrees. The angle between the three-way split conduits may be such that they may be aligned with and fluidically couple to the corresponding openings in the housing 208, as shown in FIGS. 6-8.

The second conduit 202d and the third conduit 202c split at the junction 202d at an angle less than 90 degrees. In one example, after splitting at the junction 202d at an angle less than 90 degrees, the second conduit 202b and the third conduit 202c of the three-way split conduit 202 may be parallel to each other, as illustrated in FIGS. 6-8. In other examples, after splitting at an angle less than 90 degrees at the junction 202d, the second conduit 202b and the third conduit 202c may converge towards each other or diverge away from each other, and subsequently align with and fluidically couple with the housing second opening 208b and the housing third opening 208c, respectively. In still further examples, the angle A1 between the second conduit and the third conduit at the junction may be equal to or greater than 90 degrees, as long as the angles A2 and A3 remain above a threshold angle that allows for a relatively low pressure drop across the valve assembly. For example, the angle A1 may be equal to 90 degrees, provided the angles A2 and A3 are also both greater 90 degrees (e.g., 135 degrees).

The diameter of three-way split conduit 202 may determine the volume of fluid passing through the first conduit 202a, the second conduit 202b, and the third conduit 202c. In one example, the diameter of the first conduit 202a may be larger than the second conduit 202b diameter and the third conduit 202c diameter. In another example, the second conduit 202b diameter and the third conduit 202c diameter may be equal. In another example, the second conduit 202b diameter may be more than the third conduit 202c diameter, wherein larger fluid volume may be accommodated in the second conduit 202b compared to the third conduit 202c. Conversely, the diameter of the third conduit 202c may be larger than the second conduit 202b diameter, which may result in larger fluid volume in the third conduit 202c compared to the second conduit 202b. The diameter of the three-way split conduits may be matched with the diameters of the corresponding housing openings, such that alignment and fluidic communication is established without any liquid leaking from the joining of the three-way split conduit and the corresponding housing openings, as described in FIGS. 2-3. Seals may be present between at the interface of the housing 208 openings to the three-way split conduits 202 to ensure a leak-proof fit.

The rotary ring 204 illustrated in FIGS. 5A and 5B may be coupled to the three-way split conduit 202 of the valve assembly 200, as shown in FIGS. 3-8. The rotary ring 204 inserts into the housing 208 and may be movable in relation to the housing chamber 216 containing the fixed three-way split conduit 202 and the conduit chamber 220. The movable rotary ring 204 may determine and regulate the flow path of fluid through the three-way split conduit 202. In the embodiment illustrated in FIGS. 5A and 5B, the rotary ring 204 may have a tubular wall 228 with a plurality of rotary ring openings 222. The rotary ring openings 222 may be capable of aligning with the conduits of the three-way split conduit 202 inside the housing chamber 216 of the valve assembly 200. In one example, the rotary ring openings 222 may be equally distributed along the circumference of the tubular wall 228. In another example, the rotary ring openings 222 may be unequally distributed along the circumference of the tubular wall 228. In an example, the diameter of all the openings 222 on the rotary ring 204 may be equal. In a still further example, the diameter of the rotary ring openings 222 may vary between the openings. The rotary ring 204 has a first open end 230 and a second closed end 232 opposite the rotary ring first open end 230. The rotary ring second closed end 232 may have a central hole 236, for receiving the common shaft 214 of the valve assembly 200. The common shaft 214 received in the rotary ring hole 236 may couple the rotary ring 204 to the actuator 212, as shown in FIGS. 2 and 3. The circumference of the rotary ring 204 may be such that the rotary ring 204 may insert into the housing chamber 216 and may be moved in relation to the housing 208 and the fixed three-way split conduit 202. The rotary ring may be moved by the actuator 212 coupled by the shaft 214 to the rotary ring 214. In one example, the rotary ring 204 tubular wall 228 outer perimeter may be in face sharing contact with the housing chamber 216 wall in a manner that still allows the rotary ring to be capable of moving in a clockwise and/or anticlockwise direction by the coupled actuator. In another example, a seal may be placed between the rotary ring 204 and the housing chamber 216, such that the rotary ring is movable in relation to the housing chamber 216.

In one embodiment, the rotary ring 204 with a first rotary ring opening 222a, a second rotary ring opening 222b and a third rotary ring opening 222b may be inserted in a housing chamber 216 with three-way split conduit 202 in the valve assembly 200. The rotary ring 204 may be moved by the coupled actuator 212 such that the rotary ring openings 222 may align with the three-way split conduit 202 to open or close specific fluid flow passages along the three-way split conduit 202. An example illustrating the regulation of fluid flow through the three-way split conduit 202 by the rotating the rotary ring 204 to a first position, a second position, and a third position is discussed further in FIGS. 6-8.

The actuator 212 is coupled to the rotary ring 204 through the shaft 214 of the valve assembly 200, as shown in FIG. 2-4. The shaft 214 couples the actuator 212 to the rotary ring 204 by passing through the seal 210, the housing cover 218 and inserting into the rotary ring hole 236 on rotary ring second closed end. In one example, the actuator 212 may be an electric actuator, such as a stepper motor. In another example, the actuator may be solenoid. In an example fluid circuit with the valve assembly 200, the actuator 212 may be controlled by a controller receiving sensory input from sensors in the fluid circuit, including temperature sensors. The controller may prompt the actuator to move the rotary ring 204 to the desired position based on fluid circuit sensor input.

An example illustrating the regulation of fluid flow through the three-way split conduit 202 by the movable rotary ring 204 of the valve assembly 200 is shown in FIGS. 6-8. A cross-section of a valve assembly 200 in the housing 208 with the movable rotary ring 204 and the three-way split conduit 202 is illustrated. The valve assembly 200 may be coupled to a fluid circuit. In one example, the fluid circuit may be the coolant loop of an engine. In another example, the associated fluid circuit may be the coolant loop of an exhaust gas heat recovery and storage system, as described above with respect to FIG. 1. However, the valve assembly 200 may be coupled in virtually any fluid circuit, including liquid circuits and gaseous circuits.

The housing body first opening 208a is on the first wall 209 of the housing 208 and may be fluidically coupled to a fluid circuit and serve as an inlet to bring fluid into the valve assembly 200 along an inlet flow path F1. The housing second opening 208b and the housing third opening 208c on the housing body second wall 211 may be serving as two distinct fluid outlets coupling to the fluid circuit. The three-way split conduit 202 housed in the housing chamber 216 is configured to couple with the housing 208 openings. The first conduit 202a, the second conduit 202b, and the third conduit 202c of the three-way split conduit 202 may align with and fluidically couple with the housing body first opening 208a, the second opening 208b, and the third opening 208c, respectively. The rotary ring 204 may be inserted in the housing chamber 216 and be coupled to the actuator 212 by the shaft 214, as shown in FIGS. 2-4. In the embodiment shown in FIGS. 6-8, the rotary ring 204 may have a first opening 222a, a second opening 222b, and a third opening 222c.

Referring to FIG. 6, the rotary ring 204 is shown at a first position 500, wherein the rotary ring first opening 222a is enabling fluidic coupling of the three-way split conduit's first conduit 202a to the housing first opening 208a, establishing the inlet fluid flow path F1. The rotary ring second opening 222b enables fluidic coupling of the second conduit 202b to the corresponding housing second opening 208b, establishing the first outlet flow path F2. The rotary ring third opening 222c enables fluidic coupling of the third conduit 202c to the housing third opening 208c, defining the second outlet flow path F3. The rotary ring 204 may also have a fourth opening 222d, a fifth opening 222e, and a sixth opening 222f, which may not be aligned to a fluid flow path when the rotary ring is in the first position 500, as illustrated in FIG. 6. When the rotary ring 204 is in the first position 500, fluid may flow in through the three-way valve first conduit 202a along the inlet flow path F1. At the three-way split conduit junction 202d, the fluid flow may be distributed through the second conduit 202b along the first outlet flow path F2 and through the third conduit 202c the second outlet flow path F3. In one example, equal volumes of fluid may be directed to the three-way valve second conduit 202b and to the three-way valve third conduit 202c. In another example, the volume of fluid directed to the three-way valve second conduit 202b may be different from the volume of fluid in the three-way valve third conduit 202c. The difference in fluid volume between the first outlet flow path F2 and the second outlet flow path F3 may be due to different diameter of the three-way valve second conduit 202b and the three-way valve third conduit 202c. In another example, the rotary ring opening 222b may only partially align with the three-way valve second conduit 202b, obstructing the first outlet flow path F2 partially while the second outlet flow path F3 may be completely open. In another example, the rotary ring third opening 222c may partially align with the three-way valve third conduit 202c, partially blocking the second outlet flow path F3, resulting in different fluid volume in the first outlet flow path F2 and the second outlet flow path F3. In another example, the rotary ring openings 222b and 222c may only partially align with the second conduit 202b and the third conduit 202c, thus partially enabling the first outlet flow path F2 and the second outlet flow path F3.

FIG. 7 illustrates the movable rotary ring 204 in a second position 550. The rotary ring 204 may be moved from a first position 500 to a second position 550 by the coupled actuator 212. When the movable rotary ring 204 is in the second position 550, the inlet fluid path F1 and the first outlet flow path F2 are open while the second outlet flow path F3 is blocked by the rotary ring 204. In one example, the rotary ring 204 may be moved by the actuator 212 from the first position 500 to the second position 550 by rotating the rotary ring 204 in a clockwise direction such that the rotary ring third opening 222c may move in a clockwise direction, away from the coupling interface of the third conduit 202c of the three-way split conduit 202 and housing third opening 208c. The clockwise movement of the rotary ring third opening 222c may result in the tubular wall 228 of the rotary ring 204 blocking the second outlet flow path F3. The clockwise movement of the rotary ring 204 to the second position 550 may also result the rotary ring first opening 222a and the second opening 222b moving in clockwise direction, away from the inlet flow path F1 and the first outlet flow path F2, respectively. In one example, when the rotary ring is moved to the second position 550, the fourth opening 222d may align with, and open the second flow path F2 and the fifth rotary ring opening 222e may move and align to keep the inlet flow path F1 open, as shown in FIG. 7. The rotary ring 204 first opening 222a, the second opening 222b, the third opening 222c, and the sixth opening 222f, which may not be aligned to a fluid flow path when the rotary ring is in the second position 550, as illustrated in FIG. 7. The distribution of the rotary ring openings 222 along the rotary ring tubular wall 228 may determine the degree of rotation required for the rotary ring 204 to move from the first position 500 to the second position 550. The rotary ring 204 may also transition from the first position 500 to the second position 550 by rotation in the counter-clockwise direction, such that the rotary ring may rotate a specified degree of rotation in the counter-clockwise direction to align rotary ring openings to keep the inlet flow path F1 and the first outlet path F2 open while blocking the second outlet flow path F3. Thus, the rotary ring 204 directs all the fluid flow input from the inlet flow path F1 to the first outlet fluid flow path F2, without any fluid directed to the second outlet flow path F3.

The rotary ring 204 may be rotated by the coupled actuator to a third position 552, as illustrated in FIG. 8. When the rotary ring 204 is in the third position 552, the inlet flow path F1 and the second outlet flow path F3 may be open, while the first outlet flow path may be blocked. In one example, the rotary ring 204 moving from the first position 500 to the third position 552 may rotate in clockwise direction such that the fluidic coupling of the second conduit 202b and the housing second opening 208b is interrupted by the tubular wall 228 of the rotary ring 204. Simultaneously, the sixth rotary ring opening 222f may replace the rotary ring opening 222a keeping the inlet flow path F1 open. Similarly, the second outlet flow path F3 is kept open by the alignment of the second rotary ring opening 222b to the third conduit 202c and the housing opening 208c. The first opening 222a, the third opening 222c, the fourth opening 222d, and the fifth opening 222e of the rotary ring 204 may not be aligned with any fluidic path when the rotary ring is in second position 550, as illustrated in FIG. 8.

The transition of the rotary ring between the first position, the second position and the third position may be enabled by specific distribution of the rotary ring openings complemented by the degree of rotation of the rotary ring by the actuator. In one example, the rotation to transition the rotary ring between the first position, the second position and the third position may be enabled by clock wise rotation of the ring. In another example, counterclockwise direction may move the rotary ring to the specified positions. In a further example, a combination of clockwise and counterclockwise rotation may be used to transition the rotary ring between the three positions. In one example, the rotary ring rotatable to each of the first position, second position, and third position within one rotation of the rotary ring. The rotary ring may also be held in a position shutting of both the outlet flow paths, shutting off the fluid outflow from the valve assembly 200.

Figure 9:
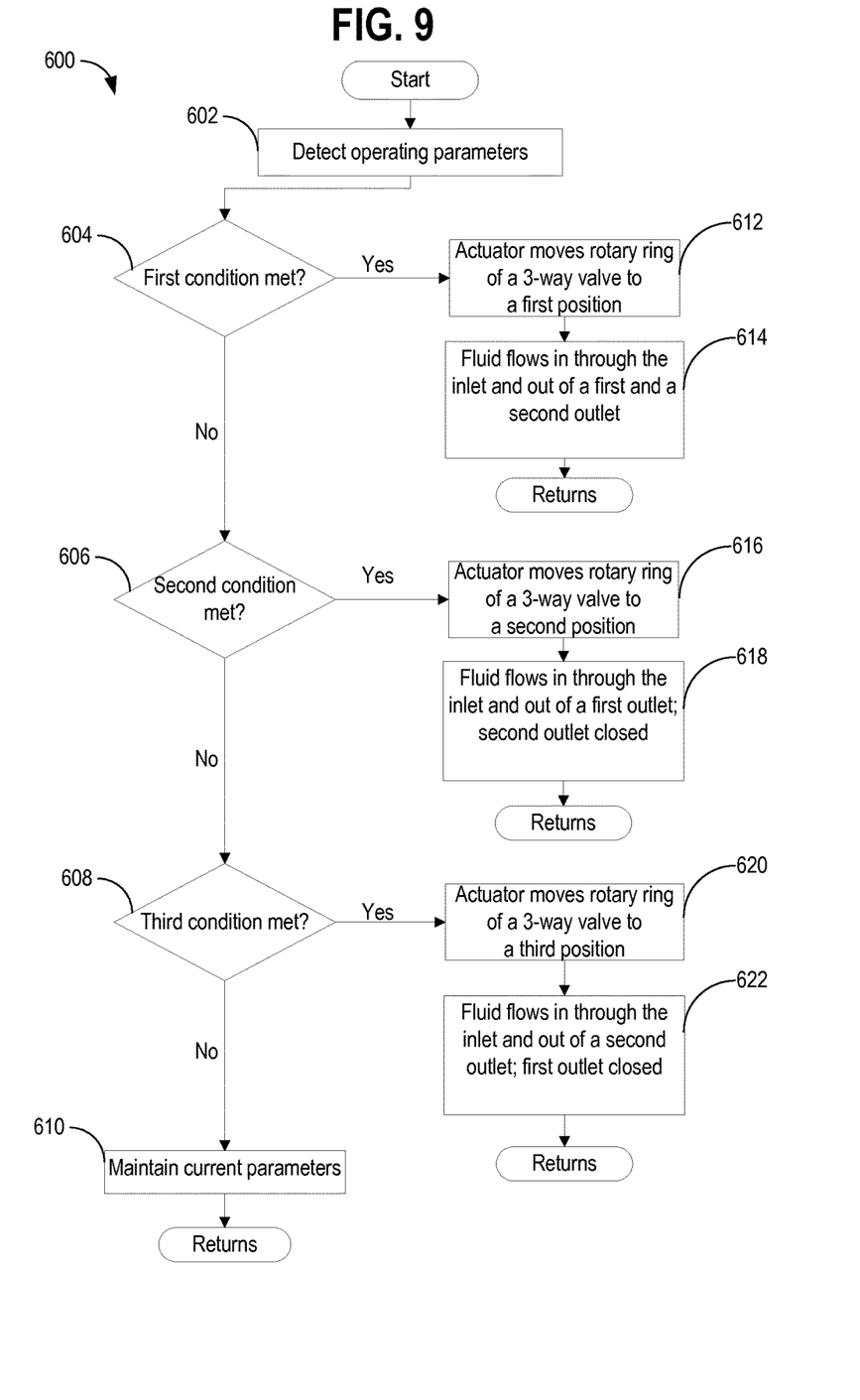
FIG. 9 shows an example routine for directing fluid flow through the three-way valve with a mounted rotary ring.

An example method 600 for the regulation of fluid flow by a three-way valve assembly with a movable rotary ring is shown in FIG. 9. The method 600 regulates the flow of fluid through a three-way valve, such as the valve assembly 200 described above. The three-way valve may include a rotary ring and a split conduit with one fluid inlet, splitting into a first and second fluid outlet with less than 90 degree angle at the junction of the splitting first and second outlet. The rotary ring may be coupled to an actuator for moving the rotary ring to open or close fluid passages through the three-way split conduits. The actuator may be controlled by a controller which may receive input form a plurality of sensors, including temperature sensors downstream and/or upstream of the three-way valve. The method 600 is a non-limiting example method for a three-way valve assembly associated with a fluid circuit. The method 600 may be adapted for three-way fluid flow regulation in any fluid circuit, including engine and non-engine fluid circuits. Instructions for carrying out method 600 may be executed by a controller based on instructions stored on a memory of the controller and in conjunction with signals received from sensors of the system, such as the sensors described above with reference to FIG. 1. The controller may employ actuators of the system to adjust system operation, according to the methods described below.

The method 600 detects operating parameters at 602, such as fluid temperature, fluid pressure, fluid flow rate, etc. of the fluid in the fluid circuit. At 604, method 600 detects if a first condition is met. In one example, the first condition may be the fluid temperature at or above a threshold temperature downstream of a three way valve. If the first condition is met, the method 600 proceeds to 612, where an actuator coupled to a rotary ring of the three-way valve rotates the valve rotary ring to a first position. After positioning the rotary ring in the first position, the method proceeds to 614, where fluid flows out of the first and second outlets of the three way valve. An example of the three-way valve in a first position is illustrated in FIG. 6. In an example, the three-valve 110 of an engine coolant loop described in FIG. 1 may be in the first position, flowing coolant to the TBS through a first outlet and to the downstream coolant circuit through the second outlet. The first position may split the inlet coolant flow into two outlet flow paths such that coolant may be directed partly towards the TBS to maintain TBS at optimal temperature range which may help maintain desired TBS temperature. The remaining coolant may bypass the TBS and flow in the coolant line towards the coolant pump. In some examples, the first condition may further comprise a downstream coolant demand, such that at least some coolant is still directed to downstream components of the cooling circuit. In the example circuit of FIG. 1, the heat exchanger may have a coolant demand (e.g., heat transfer between the coolant and other fluid in the heat exchanger may be desired) based on demand for cabin heating, demand for differential fluid heating, or other parameter. Additionally, the first condition may include the TBS being below storage capacity, at least in some examples.

If first condition is not met, the method 600 proceeds to 606, to assess if a second condition is met, for example if the fluid temperature is above the threshold temperature and there are no downstream fluid demands. If second condition is met, the method 600 proceeds to 616, where the actuator moves the rotary ring to a second position. The method 600 proceeds to 618 where fluid flows out through the first outlet while the second outlet is closed. In the example coolant loop 102 shown in FIG. 1, the valve 110 may be moved into the second position when the coolant temperature is relatively high, such that high temperature coolant is directed to the TBS by the first outlet of the three way valve 110 to store the excess thermal energy from the coolant in the TBS, while the second outlet of the three-way valve may be closed. In this way, the TBS may be rapidly filled. In some examples, the second condition may further include the TBS being below its storage capacity. An example of the three way valve in the second position is illustrated in FIG. 7.

If the second condition is not met, the method 600 proceeds to 608, to assess if a third condition is met. If a third condition is met, the method 600 proceeds to 620, where the actuator moves the coupled rotary ring to a third position such that at 622, fluid may flow out of the third outlet while the first outlet is blocked. In one example, the third condition may be fluid temperature below a threshold temperature. An example of a three-way valve assembly in the third position is illustrated in FIG. 8. In one example, the temperature sensor 112 assessing coolant temperature may be coupled to the coolant line 102 downstream of the coolant valve 110, as illustrated in FIG. 1. If the coolant temperature is below the threshold temperature, coolant may bypass the TBS and flow downstream towards the fluid pump 104 of FIG. 1. In another example, if the coolant requirement downstream in the coolant line is immediate, the coolant may bypass the TBS and flow downstream towards the coolant pump. In still further examples, if the TBS is at storage capacity, the valve may be moved to the third position. If third condition is not met, the method 600 may maintain current operating parameters at 610. The current operating parameters may include a closed three-way valve in some examples, or other suitable configuration.

Thus, two fluid flow paths in a three-way valve with one inlet splitting into two outlets with an included angle of less than 90 degrees may be regulated by a coupled rotary ring with a plurality of openings. An actuator coupled to the rotary ring may rotate the rotary ring to open and/or close fluid passages across the three-way valve. The rotary ring openings may be configured in a manner to provide all desired fluidic couplings within a single rotation of the rotary ring in one direction. However, in some examples, desired fluidic couplings may be achieved by rotating the rotary ring in two directions. For example, if the valve assembly is in the first position where both outlets are open, rotation of the rotary ring in one direction may result in the valve assembly being in the second position, and rotation of the rotary ring in the other direction may result in the valve assembly being in the third position.

In one example, the valve assembly of the present disclosure includes only one inlet and only two outlets. In such an example, fluid flowing through the valve assembly may only enter the valve assembly via the inlet. Further, fluid flowing through the valve assembly may only exit the valve assembly via one or both of the outlets. Once fluid enters the valve assembly, the fluid may only exit the valve assembly though one or both of the outlets and may not exit the valve assembly through any other passages, openings, or outlets. When the outlet of the second conduit is blocked and the outlet of the third conduit is open (e.g., when the rotary ring is in the third position described above), fluid entering valve assembly only travels through the first conduit and through the third conduit to exit the valve assembly. When the outlet of the third conduit is blocked and the outlet of the second conduit is open (e.g., when the rotary ring is in the second position described above), fluid entering the valve assembly only travels through the first conduit and through the second conduit to exit the valve assembly. When the outlet of the third conduit is open and the outlet of the second conduit is open (e.g., when the rotary ring is in the first position described above), fluid entering the valve assembly only travels through the first conduit, through the second conduit to exit the valve assembly, and through the third conduit to exit the valve assembly.

While the valve assembly of the present disclosure has been described above as including on fluid inlet coupled two fluid outlets, it is to be understood that in some examples the valve assembly may include one fluid outlet coupled to two fluid inlets. Further, in some examples more than two inlets or outlets may be included. For example, the valve assembly may include one fluid inlet coupled to three fluid outlets. In each example, the rotary ring is rotatable to control flow through each fluid path.

The technical effect of regulating fluid flow through a three-way valve in which the included angle between two splitting outlets is less than 90 degrees is a decrease in pressure drop across the valve and an increase in valve efficiency due to reduced pump power required for flowing the fluid through the valve.

A valve assembly includes a housing, a split conduit fixed to the housing and including a first conduit splitting into a second conduit and to a third conduit at a junction, an included angle of the second conduit and third conduit at the junction being less than 90 degrees. A rotary ring movable relative to the housing and having a plurality of openings is configured to control fluid flow through the split conduit. In a first example of the valve assembly, the split conduit defines a first flow path including the first conduit and the second conduit and a second flow path including the first conduit and the third conduit. The first flow path and second flow path are each maintained along an entirety of the split conduit regardless of a position of the rotary ring. A second example of the valve assembly optionally includes the first example and further includes, the housing with a first opening positioned on a first wall and a second opening and a third opening each positioned on a second wall, opposite the first wall, the split conduit and the rotary ring housed in the housing. A third example of the valve assembly optionally includes one or more of the first and second examples, and further includes, the rotary ring that is rotatable to at least a first position, a second position, and a third position. A fourth example of the valve assembly optionally includes one or more of the first through third examples, and further includes, the rotary ring is in the first position, the first opening is fluidically coupled to the first conduit, the second opening is fluidically coupled to the second conduit, and the third opening is fluidically coupled to the third opening. A fifth example of the valve assembly optionally includes one or more of the first through fourth examples, and further includes, the rotary ring is in the second position, the first opening is fluidically coupled to the first conduit, the second opening is fluidically coupled to the second conduit, and the rotary ring blocks fluidic coupling between the third opening and the third conduit. A sixth example of the valve assembly optionally includes one or more of the first through fifth examples, and further includes, the rotary ring is in the third position, the first opening is fluidically coupled to the first conduit, the third opening is fluidically coupled to the third conduit, and the rotary ring blocks fluidic coupling between the second opening and the second conduit. A seventh example of the valve assembly optionally includes one or more of the first through sixth examples, and further includes, the rotary ring is rotatable to each of the first position, second position, and third position within one rotation of the rotary ring. An eighth example of the valve assembly optionally includes one or more of the first through seventh examples, and further includes, an actuator coupled to the rotary ring via a shaft. A ninth example of the valve assembly optionally includes one or more of the first through eighth examples, and further includes, a cover coupled to a top of the housing, the cover positioned intermediate the rotary ring and the actuator, the shaft extending through the cover. A tenth example of the valve assembly optionally includes one or more of the first through ninth examples, and further includes, a first seal coupled between the cover and the actuator, the first seal positioned around the shaft, and a plurality of additional seals, each respective additional seal coupled to an interior of the housing around a respective one of the first opening, second opening, and third opening.

In one embodiment, a system comprises a first fluid passage, a second fluid passage, a third fluid passage; and a valve assembly coupling the first fluid passage to the second fluid passage and to the third fluid passage. The valve assembly comprises of a housing, a split conduit fixed to the housing and including a first conduit splitting into a second conduit and to a third conduit at a junction, an included angle of the second conduit and third conduit at the junction being less than 90 degrees and a rotary ring movable relative to the housing and having a plurality of openings configured to control fluid flow through the split conduit. An actuator is axially mounted to the rotary ring via a shaft. In a first example of the system, the actuator is configured to rotate the rotary ring to a first position where the first conduit is fluidically coupled to first fluid passage, the second conduit is fluidically coupled to the second fluid passage, and the third conduit is fluidically coupled to the third fluid passage. A second example of the system optionally includes the first example and further includes, the actuator configured to rotate the rotary ring to a second position where the first conduit is fluidically coupled to first fluid passage, the second conduit is fluidically coupled to the second fluid passage, and the third conduit is fluidically blocked from the third fluid passage. A third example of the system optionally includes the first through second examples and further includes, the actuator configured to rotate the rotary ring to a third position where the first conduit is fluidically coupled to first fluid passage, the second conduit is fluidically blocked from the second fluid passage, and the third conduit is fluidically coupled to the third fluid passage.

A method for a valve assembly comprises responsive to a first condition, actuating an actuator to rotate a rotary ring of a valve assembly to a first position to direct a fluid through an inlet of the valve assembly and out of a first outlet and a second outlet of the valve assembly, flow of the fluid maintained along substantially parallel paths into the inlet and out of the first outlet and second outlet. Responsive to a second condition, actuating the actuator to rotate the rotary ring to a second position to direct the fluid through the inlet and out of the first outlet and responsive to a third condition, actuating the actuator to rotate the rotary ring to a third position to direct the fluid through the inlet and out of the second outlet. A first example of the method further includes, the actuator rotates the rotary ring to a fourth position to block fluid through the first outlet and the second outlet. A second example of the method optionally includes the first example and further includes, in the second position, the second outlet is blocked, and in the third position, the first outlet is blocked. A third example of the method optionally includes the first and second examples, and further includes, the valve assembly installed in a coolant loop, and wherein the first condition and second condition each comprise a temperature of coolant in the coolant loop being above a threshold, and the third condition comprises a temperature of the coolant being below the threshold. A fourth example of the method optionally includes the first through third examples, and further includes, actuating the actuator to rotate the rotary ring to the second position comprises actuating the actuator to rotate the rotary ring clockwise to the second position, and wherein actuating the actuator to rotate the rotary ring to the third position comprises actuating the actuator to rotate the rotary ring counterclockwise to the third position. A fifth example of the method optionally includes the first through the fourth examples, and further includes, the actuator responsive to a controller receiving fluid temperature sensor input.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A valve assembly, comprising:
   a housing;
   a split conduit housed within a conduit chamber and fixed to the housing and including a first conduit splitting into a second conduit and to a third conduit at a conduit junction within the conduit chamber, an included angle of the second conduit and the third conduit at the conduit junction being less than 90 degrees; and
   a rotary ring movable relative to the housing and relative to the conduit chamber and having a plurality of openings configured to control fluid flow through the split conduit.

2. The valve assembly of claim 1, wherein the split conduit defines a first flow path including the first conduit and the second conduit and a second flow path including the first conduit and the third conduit, and wherein the first flow path and second flow path are each maintained along an entirety of the split conduit regardless of a position of the rotary ring.

3. The valve assembly of claim 2, wherein the housing includes a first opening positioned on a first wall and a second opening and a third opening each positioned on a second wall, opposite the first wall, the split conduit and the rotary ring housed in the housing.

4. The valve assembly of claim 3, wherein the rotary ring is rotatable to at least a first position, a second position, and a third position.

5. The valve assembly of claim 4, wherein when the rotary ring is in the first position, the first opening is fluidically coupled to the first conduit, the second opening is fluidically coupled to the second conduit, and the third opening is fluidically coupled to the third conduit.

6. The valve assembly of claim 5, wherein when the rotary ring is in the second position, the first opening is fluidically coupled to the first conduit, the second opening is fluidically coupled to the second conduit, and the rotary ring blocks fluidic coupling between the third opening and the third conduit.

7. The valve assembly of claim 6, wherein when the rotary ring is in the third position, the first opening is fluidically coupled to the first conduit, the third opening is fluidically coupled to the third conduit, and the rotary ring blocks fluidic coupling between the second opening and the second conduit.

8. The valve assembly of claim 4, wherein the rotary ring is rotatable to each of the first position, second position, and third position within one rotation of the rotary ring.

9. The valve assembly of claim 3, further comprising an actuator coupled to the rotary ring via a shaft.

10. The valve assembly of claim 9, further comprising a cover coupled to a top of the housing, the cover positioned intermediate the rotary ring and the actuator, the shaft extending through the cover.

11. The valve assembly of claim 10, further comprising a first seal coupled between the cover and the actuator, the first seal positioned around the shaft, and a plurality of additional seals, each respective additional seal coupled to an interior of the housing around a respective one of the first opening, second opening, and third opening.

12. A system, comprising:
   a first fluid passage;
   a second fluid passage;
   a third fluid passage; and
   a valve assembly coupling the first fluid passage to the second fluid passage and to the third fluid passage, the valve assembly comprising:
      a housing;
      a split conduit housed within a conduit chamber fixed to the housing and including a first conduit splitting into a second conduit and to a third conduit at a conduit junction within the conduit chamber, an included angle of the second conduit and third conduit at the conduit junction being less than 90 degrees;
      a rotary ring movable relative to the housing and relative to the conduit chamber and having a plurality of openings configured to control fluid flow through the split conduit; and
      an actuator axially mounted to the rotary ring via a shaft.

13. The system of claim 12, wherein the actuator is configured to rotate the rotary ring to a first position where the first conduit is fluidically coupled to the first fluid passage, the second conduit is fluidically coupled to the second fluid passage, and the third conduit is fluidically coupled to the third fluid passage.

14. The system of claim 13, wherein the actuator is configured to rotate the rotary ring to a second position where the first conduit is fluidically coupled to the first fluid passage, the second conduit is fluidically coupled to the second fluid passage, and the third conduit is fluidically blocked from the third fluid passage.

15. The system of claim 14, wherein the actuator is configured to rotate the rotary ring to a third position where the first conduit is fluidically coupled to the first fluid passage, the second conduit is fluidically blocked from the second fluid passage, and the third conduit is fluidically coupled to the third fluid passage.

16. A method, comprising:
   responsive to a first condition, actuating an actuator to rotate a rotary ring of a valve assembly relative to a conduit chamber and relative to a housing to a first position to direct a fluid through an inlet of the valve assembly and through the conduit chamber and out of a first outlet and a second outlet of the valve assembly, flow of the fluid maintained along substantially parallel paths into the inlet and out of the first outlet and the second outlet;
   responsive to a second condition, actuating the actuator to rotate the rotary ring relative to the conduit chamber and relative to the housing to a second position to direct the fluid through the inlet of the valve assembly and through the conduit chamber and out of the first outlet; and responsive to a third condition, actuating the actuator to rotate the rotary ring relative to the conduit chamber and relative to the housing to a third position to direct the fluid through the inlet of the valve assembly and through the conduit chamber and out of the second outlet.

17. The method of claim 16, wherein the actuator rotates the rotary ring to a fourth position to block fluid through the first outlet and the second outlet.

18. The method of claim 16, wherein in the second position, the second outlet is blocked, and in the third position, the first outlet is blocked.

19. The method of claim 16, wherein the valve assembly is installed in a coolant loop, and wherein the first condition and second condition each comprises a temperature of coolant in the coolant loop being above a threshold, and the third condition comprises the temperature of the coolant being below the threshold.

20. The method of claim 16, wherein actuating the actuator to rotate the rotary ring to the second position comprises actuating the actuator to rotate the rotary ring clockwise to the second position, and wherein actuating the actuator to rotate the rotary ring to the third position comprises actuating the actuator to rotate the rotary ring counterclockwise to the third position.

* * * * *